United States Patent [19]

Assis

[11] Patent Number: 5,661,783
[45] Date of Patent: Aug. 26, 1997

[54] ELECTRONIC SECRETARY

[76] Inventor: Offer Assis, 147-28 69th Rd., Flushing, N.Y. 11367

[21] Appl. No.: 651,210

[22] Filed: May 22, 1996

[51] Int. Cl.$^6$ .................................................. H04M 1/64
[52] U.S. Cl. ................................................. 379/67; 379/89
[58] Field of Search .................................. 379/67, 88, 89, 379/194, 69, 94, 265, 142; 370/81

[56] References Cited

U.S. PATENT DOCUMENTS

| | | | |
|---|---|---|---|
| 4,853,952 | 8/1989 | Jachmann et al. | 379/89 |
| 4,935,954 | 6/1990 | Thompson et al. | 379/94 |
| 5,311,574 | 5/1994 | Livanos | 379/67 |
| 5,349,636 | 9/1994 | Iribarren | 379/67 |
| 5,454,030 | 9/1995 | de Oliveira | 379/88 |
| 5,461,665 | 10/1995 | Shur | 379/67 |
| 5,483,580 | 1/1996 | Brandman | 379/88 |
| 5,500,859 | 3/1996 | Sharma et al. | 370/81 |
| 5,524,137 | 6/1996 | Rhee | 379/67 |
| 5,530,740 | 6/1996 | Iribarren | 379/67 |
| 5,533,103 | 7/1996 | Peavey | 379/67 |

*Primary Examiner*—Dwayne Bost
*Assistant Examiner*—Thomas F. Presson
*Attorney, Agent, or Firm*—Michael I. Kroll

[57] ABSTRACT

An electronic secretary consisting of a telephone recorder electronically connected to a telephone street line and a computer connected to the telephone recorder. The computer contains software to digitize the recorded messages and has the capability to display the messages on a monitor and to print out one a printer. The computer also contains voice recognition software.

1 Claim, 2 Drawing Sheets

ELECTRONIC SECRETARY

BACKGROUND OF THE INVENTION

1. Field of the Invention

The present invention relates to an electronic secretary. More particularly, the present invention relates to an electronic secretary which is capable of recording voice messages and translating them digitally which can be displayed on a computer monitor, speaker, and/or printer.

2. Description of the Prior Art

In the prior art there are message recorders, telephones and computers having monitors and printers attached thereto. However, until the present invention, an electronic secretary having voice recognition and automatic dialing in conjunction with recording, play back, monitor display, and printing capabilities seamlessly integrated into one system has not been accomplished.

Numerous innovations for message recording, displaying and printing devices are provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to an electronic secretary. More particularly, the present invention relates to an electronic secretary which is capable of recording voice messages and translating them digitally, utilizing a voice recognition computer software, which can be displayed on a computer monitor, speaker, and/or printer. The electronic secretary gives the user the ability to listen to a caller voice message, via a recorder speaker, which has been stored on a recorder as well as digitizing the caller voice message to a be printed on a printer. The electronic secretary is electronically connectable to a computer and the digitized caller voice message can be optionally displayed on the computer monitor. A user can review his caller voice messages by printing out a journal of all the caller voice messages and/or displaying the caller voice messages on the computer monitor and thereafter "tagging" the important caller voice messages which can then be printed. In addition, the "tagged" important caller voice messages can be responded to automatically and effortlessly by activating a computer software call back feature which utilizes an automatic dialing computer software via a computer modem. Furthermore, the electronic secretary has the ability to print out a journal of all the "tagged" important caller voice messages which have been responded thereto which allows the user to instantly see which "tags" are still present and require additional response thereto. The electronic secretary could also be a portable device such as a pager which records and stores the digital information for future transference to a computer and/or printer. The digitized message can also be converted to a facsimile format. Advertising can be printed out simultaneously when the digitized message is printed.

The types of problems encountered in the prior art are human secretaries are expensive and often unreliable.

In the prior art, unsuccessful attempts to solve this problem were attempted namely: message recording devices such as answering machines. However, the problem was solved by the present invention because the voice message is received and converted digitally utilizing a voice recognition computer software.

Innovations within the prior art are rapidly being exploited in the field of office automation.

The present invention went contrary to the teaching of the art which describes automatic recording devices and audio playback means.

The present invention solved a long felt need to replace unreliable and expensive secretaries.

The present invention produced unexpected results namely: due to the accuracy of the voice recognition software, message errors were reduced thereby making the entire business more efficient which resulted in increased profits.

A synergistic effect was produced utilizing the present invention due to the following facts and results from experimentation: the automatic call back dialing feature allowed off peak time call back which reduces telephone access costs resulting in greater net profits.

Accordingly, it is an object of the present invention to provide an electronic secretary.

More particularly, it is an object of the present invention to provide an electronic secretary comprising a recorder, a printer, a telephone, a computer, computer operating software, voice recognition computer software, and voice recognition computer software.

In keeping with these objects, and with others which will become apparent hereinafter, one feature of the present invention resides, briefly stated, in the recorder comprising a recorder speaker to play back caller audible messages and a recorder microphone to record user audible message.

When the printer is designed in accordance with the present invention, it comprises a first printer cable electronically connected to the recorder and a second printer cable electronically connected to the computer.

In accordance with another feature of the present invention, the telephone comprises a telephone first line electronically connected to a telephone street line and a telephone second line electronically connected to the telephone.

Another feature of the present invention is that the computer has a computer interface control card electronically connected to a computer first serial cable which is electronically connected to the recorder.

Yet another feature of the present invention is that the computer comprises a computer monitor electronically connected by a computer monitor cable.

Still another feature of the present invention is that the computer contains a computer CPU and a computer storage means whereby computer operating software, voice recognition computer software, and audio/text/dialing computer software is stored.

Yet still another feature of the present invention is that the computer has a computer modem.

Still yet another feature of the present invention is that the computer modem is electronically connected to a computer modem line which is electronically connected to the telephone street line.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

EMBODIMENT

10—electronic secretary (10)
12—recorder (12)
12A—recorder speaker (12A)
12B—recorder microphone (12B)
14—printer (14)
14A'first printer cable (14A)
14B—second printer cable (14B)
16—printer paper (16)
18—telephone (18)
18A—telephone first line (18 A)
18B—telephone second line (18B)
18C—telephone street line (18C)
20—computer (20)
20A—computer first serial cable (20A)
20B—computer interface control card (20B)
20C—computer monitor (20C)
20CA—computer monitor cable (20CA)
20D—computer CPU (20D)
20E—computer storage means (20E)
20F—computer modem (20F)
20FA—computer modem line (20FA)
22—computer operating software (22)
24—voice recognition computer software (24)
26—audio/text/dialing computer software (26)
26A—computer software call back feature (26A)

FIRST METHOD (110) OF UTILIZING AN ELECTRONIC SECRETARY (10)

110—first method (110) of utilizing an electronic secretary (10)
112—receiving and recording (112) a caller message containing a caller address from a telephone street line (18C) which is electronically connected to a telephone first line (18A) by a recorder microphone (12B) which is electronically connected to a recorder (12) utilizing a voice recognition software (24) which is electronically stored therein
114—listening (114) to the caller message containing a caller address through a recorder speaker (12A)
116—receiving (116) electronically from the recorder (12) the caller message coming a caller address by a computer first serial cable (20A) which is electronically connected to a computer interface control card (20B) which is electronically connected to a computer (20)
118—viewing (118) the caller message containing a caller address on a computer monitor (20C) which is electronically connected to the computer (20) by a computer monitor cable (20CA)
120—first printing (120) by electronically transferring the caller message containing a caller address by a first printer cable (14A) to a printer (14)
122—tagging (122) at least one item of the caller message containing a caller address displayed on the computer monitor (20C)
124—recording (124) a user message utilizing the voice recognition software (24)
126—dialing (126) automatically the at least one tagged caller address of the caller message by a computer modem (20F) utilizing an automatic audio/text/dialing computer software (26)
128—sending (128) the user message to the at least one tagged caller address through the computer modem (20F) by a computer modem line (20FA) which is electronically connected to the telephone street line (18C)
130—second printing (130) the user message by electronically transferring by a second printer cable (14B) to a printer (14)

DESCRIPTION OF THE PREFERRED EMBODIMENT

Figure 1:
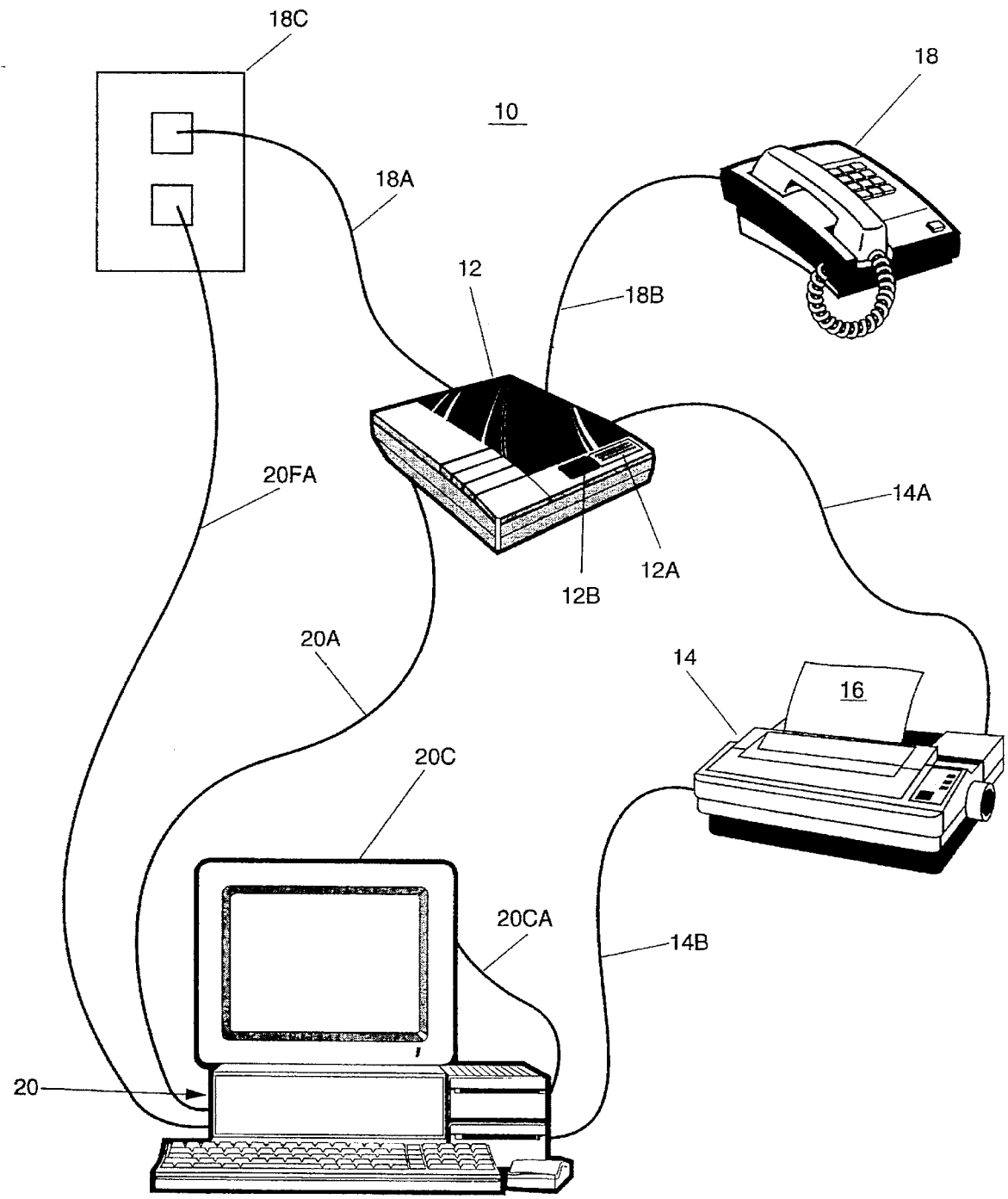
FIG. 1 is a perspective view of an electronic secretary.

Firstly, referring to FIG. 1 which is a perspective view of an electronic secretary (10). The recorder (12) comprises a recorder speaker (12A) and a recorder microphone (12B). The recorder (12) is electronically connected to a telephone street line (18C) by a telephone first line (18A) and electronically connected to a telephone (18) by a telephone second line (18B). The recorder (12) is electronically connected to a computer interface control card (20B) within the computer (20) by a computer first serial cable (20A). The recorder speaker (12A) allows a user to play back and hear caller messages which have been stored in the recorder (12) utilizing voice recognition computer software (24) which is preferably stored in the computer storage means (20E) of the computer (20) and/or optionally stored in the recorder (12). The recorder microphone (12B) allows the user to record a greeting message as well as record a message or messages which is(are) digitized by the audio/text/dialing computer software (26) and stored in the computer storage means (20E) of the computer (20). The stored user message can be transmitted electronically to numerous callers via the audio/text/dialing computer software (26) in conjunction with a computer modem (20F) electronically connected within the computer (20). The computer modem (20F) is electronically connected to a telephone street line (18C) by a computer modem line (20FA).

A computer monitor (20C) is electronically connected to the computer (20) by a computer monitor cable (20CA). The computer monitor (20C) displays recorded caller messages thereon. The computer (20) has a computer CPU (20D) utilizing computer operating software (22) to integrally process all information contained and entered therein and/or transmitted therethrough. A printer (14) is electronically connected to the recorder (12) by a first printer cable (14A) and electronically connected to the computer (20) by a second printer cable (14B). The printer (14) allows the user to print text of the stored caller messages fro the recorder (12) and/or the computer (20).

The electronic secretary (10) allows the user the ability to listen to a caller voice message, via a recorder speaker (12A), which has been stored on a recorder (12) as well as digitizing the caller voice message utilizing voice recognition computer software (24) to a be printed on printer paper (16) contained within a printer (14). The recorder (12) is electronically connectable to a computer (20) and the digitized caller voice message can be optionally displayed on the computer monitor (20C). A user can review his caller voice messages by printing out a journal on the printer (14) of all the caller voice messages and/or displaying the caller voice messages on the computer monitor (20C) and thereafter "tagging" the important caller voice messages which can then be printed on the printer (14). In addition, the "tagged" important caller voice messages can be responded to automatically and effortlessly by activating a computer software call back feature (26A) which utilizes an audio/text/dialing computer software (26) via the computer modem (20F). Furthermore, the electronic secretary (10) has the ability to print out a journal of all the "tagged" important caller voice messages which have been responded thereto allowing the user to instantly see which "tags" are still present and require additional response thereto.

Figure 2:
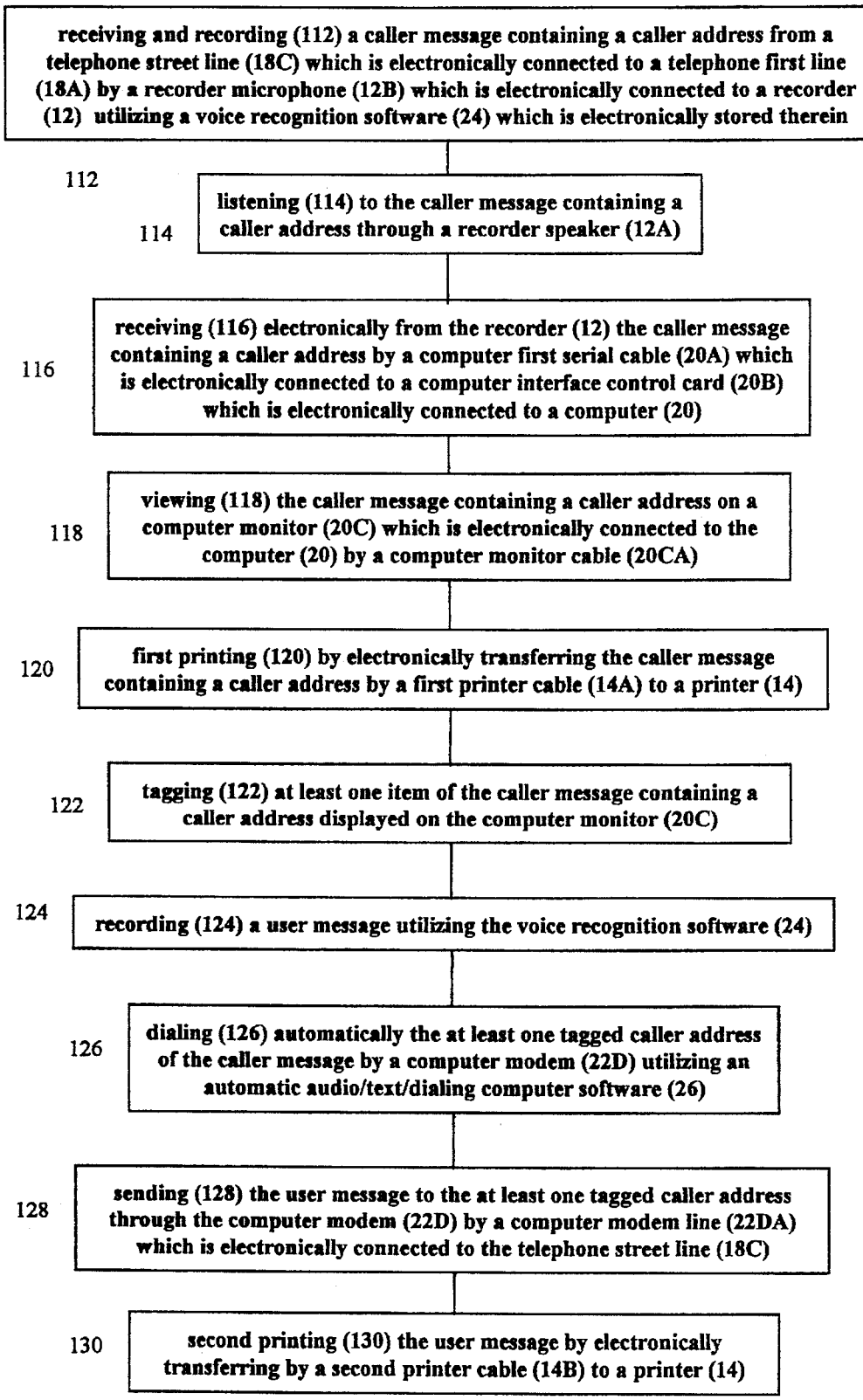
FIG. 2 is a diagrammatic representation of a method (110) of utilizing an electronic secretary (10).

Referring to FIG. 2 which is a diagrammatic representation of a method (110) of utilizing an electronic secretary (10) consisting of the following steps:

A) receiving and recording (112) a caller message containing a caller address from a telephone street line (18C) which is electronically connected to a telephone first line (18A) by a recorder microphone (12B) which is electronically connected to a recorder (12) utilizing a voice recognition software (24) which is electronically stored therein;

B) listening (114) to the caller message containing a caller address through a recorder speaker (12A);

C) receiving (116) electronically from the recorder (12) the caller message containing a caller address by a computer first serial cable (20A) which is electronically connected to a computer interface control card (20B) which is electronically connected to a computer (20);

D) viewing (118) the caller message containing a caller address on a computer monitor (20C) which is electronically connected to the computer (20) by a computer monitor cable (20CA);

E) first printing (120) by electronically transferring the caller message containing a caller address by a first printer cable (14A) to a printer (14);

F) tagging (122) at least one item of the caller message containing a caller address displayed on the computer monitor (20C);

G) recording (124) a user message utilizing the voice recognition software (24);

H) dialing (126) automatically the at least one tagged caller address of the caller message by a computer modem (20F) utilizing an automatic audio/text/dialing computer software (26);

I) sending (128) the user message to the at least one tagged caller address through the computer modem (20F) by a computer modem line (20FA) which is electronically connected to the telephone street line (18C); and J) second printing (130) the user message by electronically transferring by a second printer cable (14B) to a printer (14).

It will be understood that each of the elements described above, or two or more together, may also find a useful application in other types of constructions differing from the type described above.

While the invention has been illustrated and described as embodied in a electronic secretary, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. The method of operating an electronic secretary comprising the steps of:

a. a user receiving and recording by telephone caller messages and addresses on a recorder having a speaker and a microphone, said recorder being linked to a computer having a monitor;

b. playing back through said speaker caller messages stored in said recorder utilizing voice recognition computer software stored in said computer, digitizing the caller messages, and displaying the caller messages including caller addresses on said monitor, said user tagging important caller messages;

c. utilizing said microphone to record a greeting and other messages by said user, said messages being digitized and stored in said computer, and transmitting said user messages to selected callers using automatic dialing software;

d. responding automatically to tagged important caller messages utilizing computer call back including automatic dialing software to place telephone calls to the callers of tagged caller messages; and f. printing out a journal of caller messages showing which caller messages have been responded to and which tagged caller messages have not been responded to.

* * * * *